No. 833,797. PATENTED OCT. 23, 1906.
J. F. OLLRICH.
CUTTER HEAD FOR SUCTION DREDGES.
APPLICATION FILED MAR. 6, 1906.
4 SHEETS—SHEET 1.
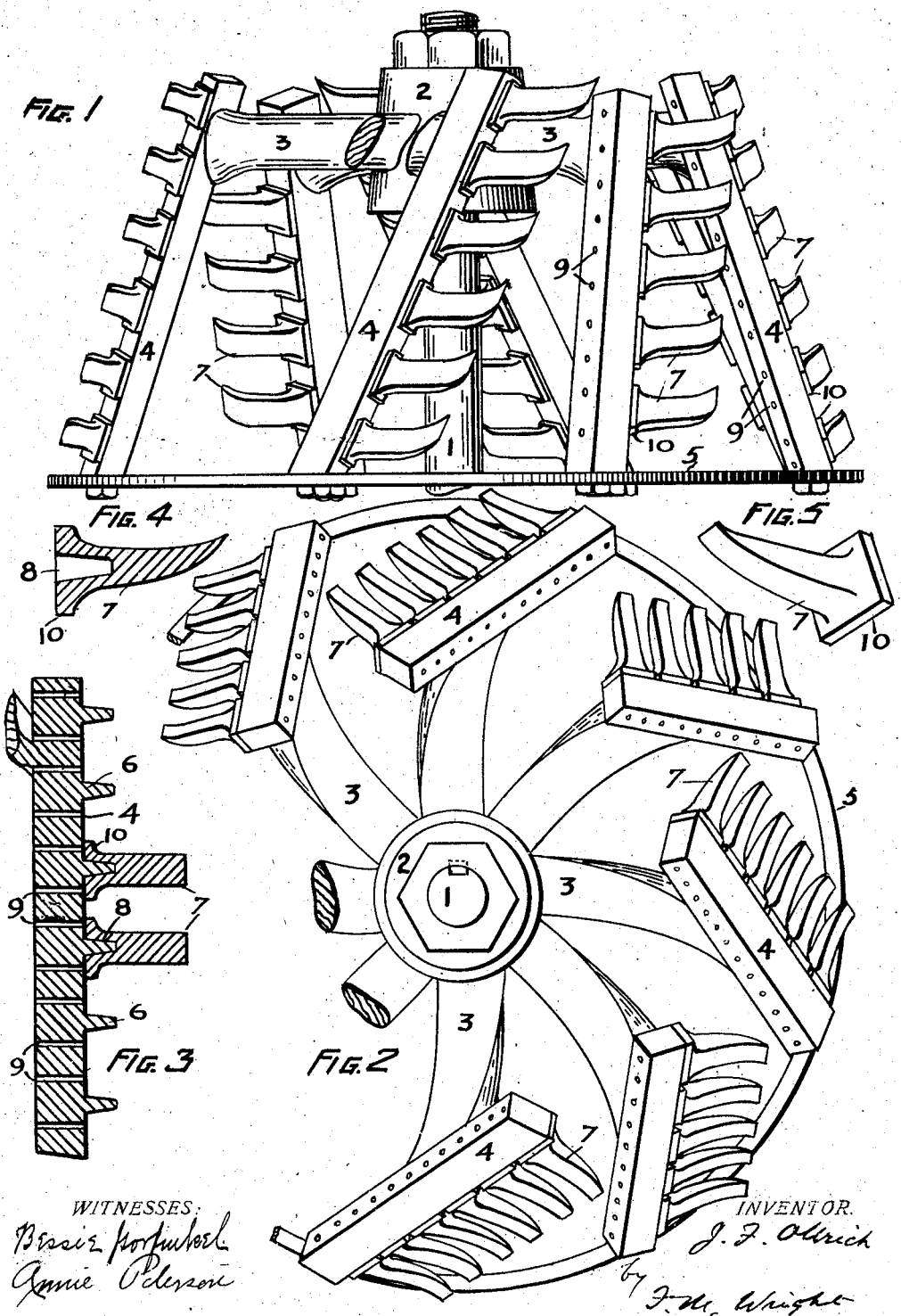

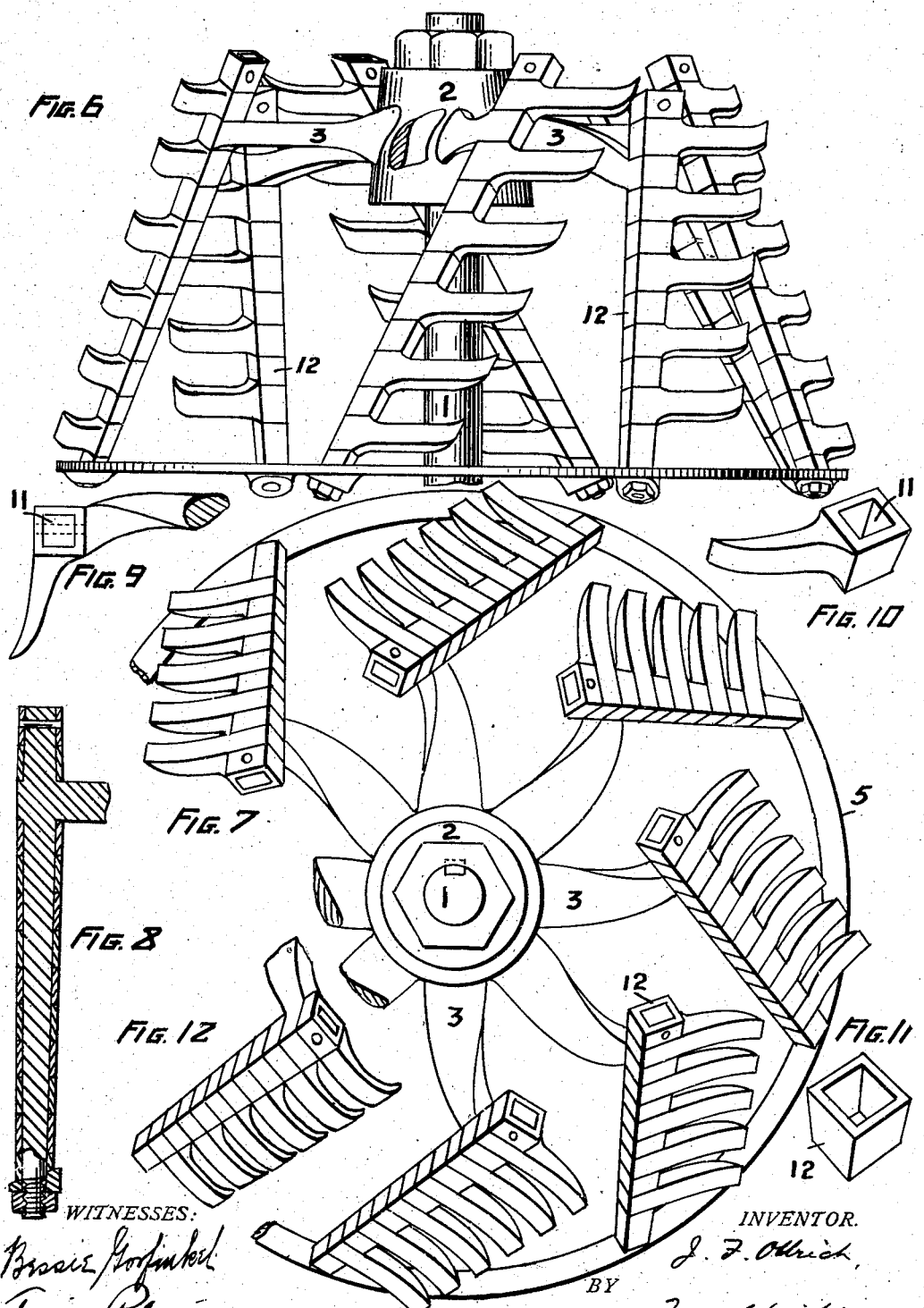

No. 833,797. PATENTED OCT. 23, 1906.
J. F. OLLRICH.
CUTTER HEAD FOR SUCTION DREDGES.
APPLICATION FILED MAR. 6, 1906.
4 SHEETS—SHEET 3.
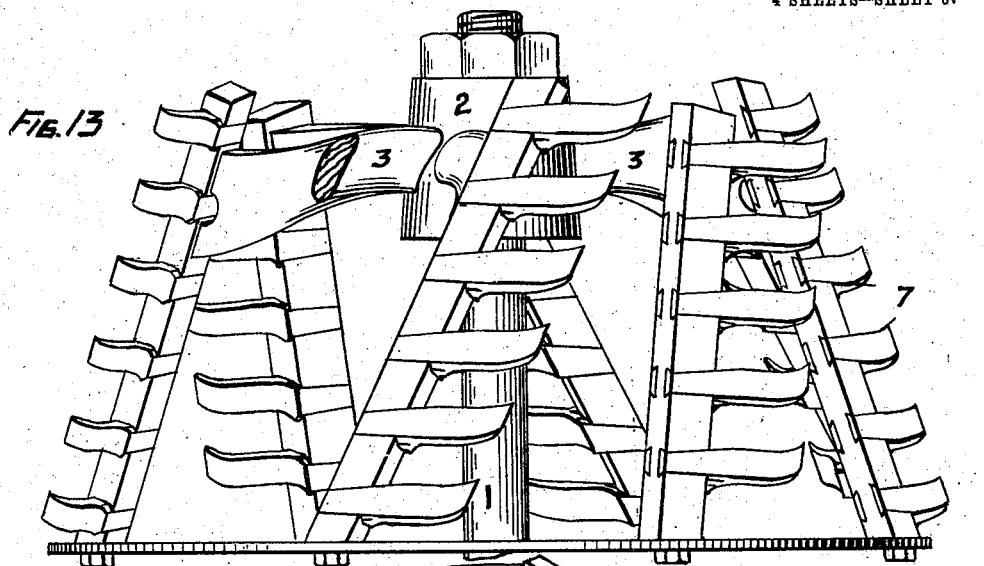
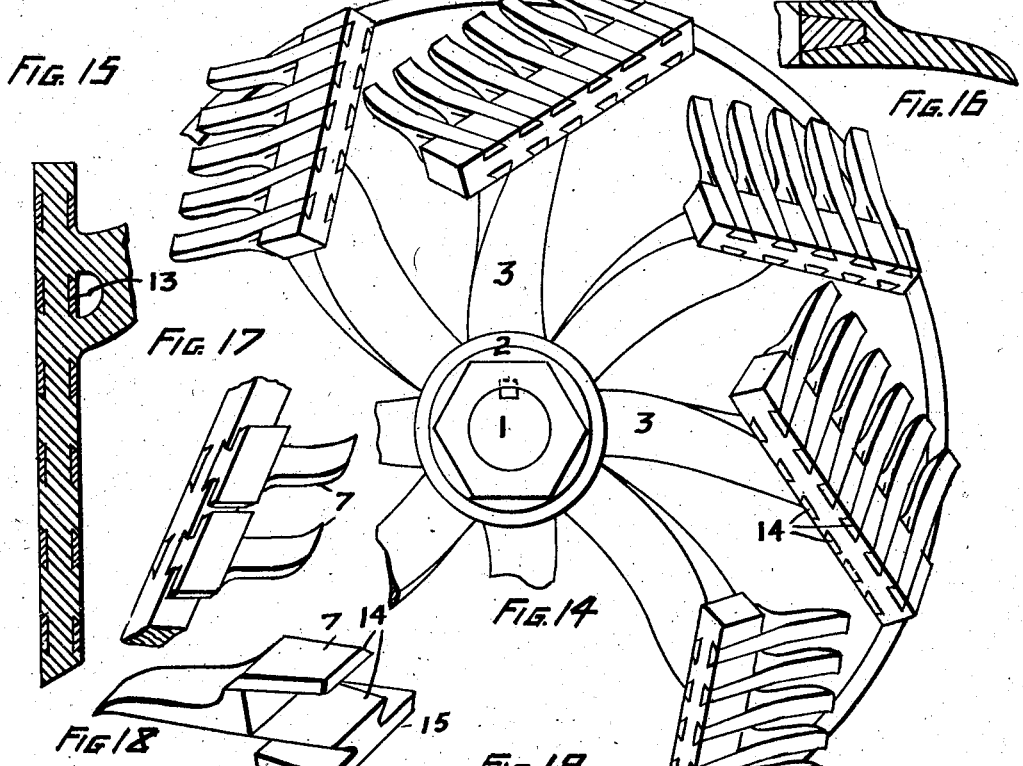
WITNESSES:
INVENTOR.
J. F. Ollrich
BY
ATTORNEY.

No. 833,797. PATENTED OCT. 23, 1906.
J. F. OLLRICH.
CUTTER HEAD FOR SUCTION DREDGES.
APPLICATION FILED MAR. 6, 1906.
4 SHEETS—SHEET 4.
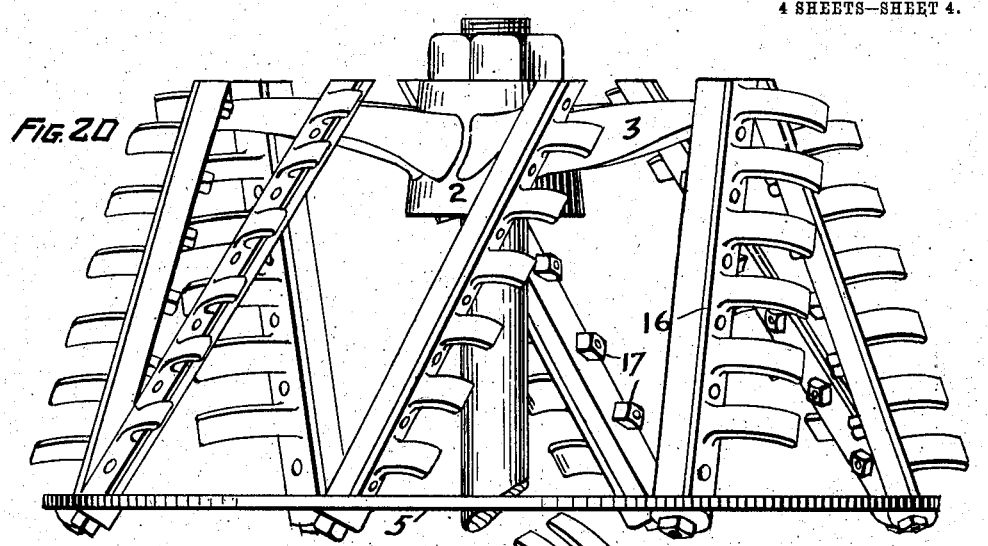
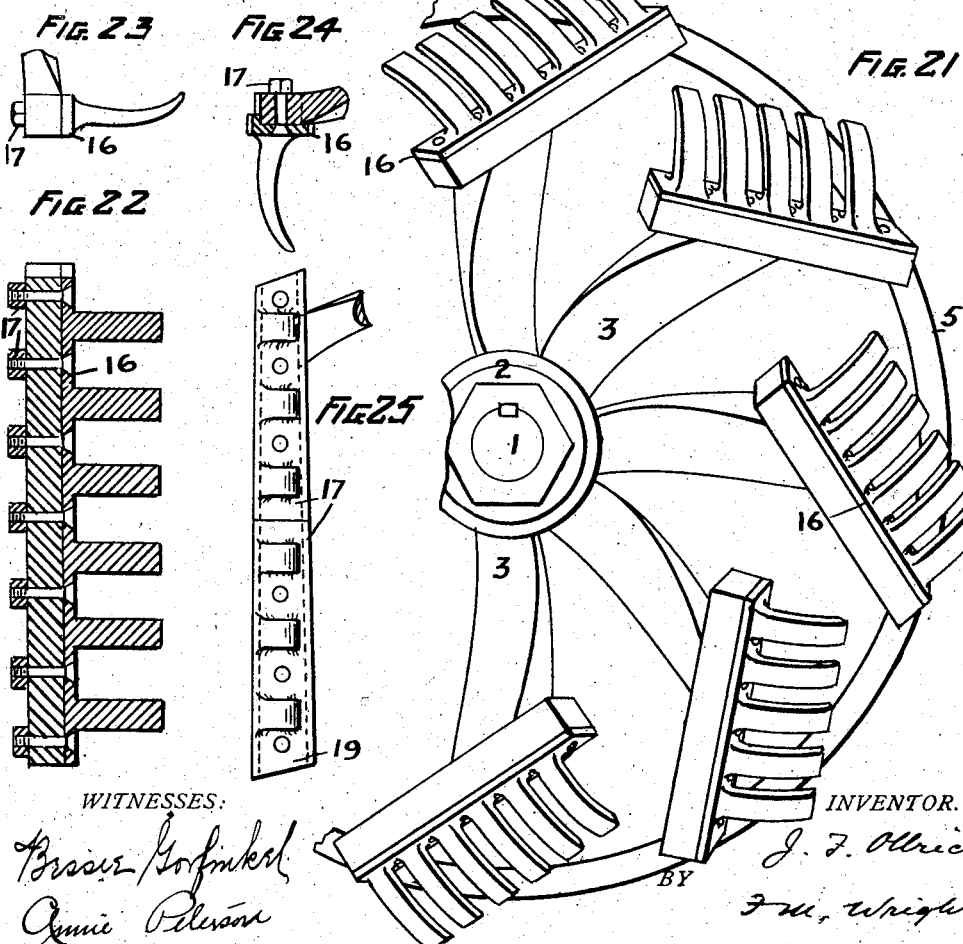
WITNESSES:
INVENTOR.
J. F. Ollrich
BY
ATTORNEY.

UNITED STATES PATENT OFFICE.

JOHN F. OLLRICH, OF SAN FRANCISCO, CALIFORNIA.

CUTTER-HEAD FOR SUCTION-DREDGES.

No. 833,797.　　　Specification of Letters Patent.　　　Patented Oct. 23, 1906.

Application filed March 6, 1906. Serial No. 304,432.

*To all whom it may concern:*

Be it known that I, JOHN F. OLLRICH, a citizen of the United States, residing at San Francisco, in the county of San Francisco and State of California, have invented certain new and useful Improvements in Cutter-Heads for Suction-Dredges, of which the following is a specification.

This invention relates to cutter-heads and teeth therefor for dredging-machines, the object of the invention being to provide cutter-heads and teeth which will be more effective than those heretofore employed and will also be more durable and secure.

In the accompanying drawings, Figure 1 is a side view of one form of my improved cutter-head. Fig. 2 is a broken end view of the same. Fig. 3 is an enlarged longitudinal section of one of the cutter-bars. Fig. 4 is a longitudinal section of one of the teeth. Fig. 5 is a perspective view of the tooth. Figs. 6, 7, and 8 are views similar to Figs. 1, 2, and 3, respectively, of a modified construction. Fig. 9 is an end view of a bar. Fig. 10 is a perspective view of a tooth. Fig. 11 is a perspective view of a washer, all in accordance with said modification. Fig. 12 is a perspective view of a bar, showing a modification of the teeth. Figs. 13, 14, and 15 are views similar to Figs. 1, 2, and 3 of a further modification. Fig. 16 is a longitudinal section of a tooth. Fig. 17 is a perspective view of a portion of the head, showing a further modification. Fig. 18 is a perspective view of said modified form of tooth. Fig. 19 is a perspective view of a further modification of the tooth. Figs. 20, 21, 22 are views similar to Figs. 1, 2, and 3 of a further modification. Fig. 23 is an end view of the bar. Fig. 24 is a sectional view. Fig. 25 is a front view showing a further modification.

Referring to the drawings, 1 represents the shaft of the cutter-head, having secured thereon the hub 2, from which radiate the arms or spokes 3, upon the ends of which are formed the bars 4, all lying in a skew surface of revolution—that is, in planes oblique to that through the shaft—and also extending farthest outward from the shaft at the end farthest from the hub 2. All of said outer ends are connected by a ring 5. This ring holds all the parts rigidly together.

Upon each bar are formed tapering posts 6, upon which are firmly driven cutting-teeth 7, having corresponding tapering sockets 8 to fit upon said posts. The pressure of the material which is being cut tends to force said teeth onto said posts and hold them firmly thereon. The bar is perforated, as shown at 9, to permit of a tool being inserted through the bar behind the base 10 of the tooth to drive it outward to release it from the bar.

In the modification shown in Figs. 6 to 12 the teeth are formed with hollow square bases 11, forming sleeves which are passed upon the bars, being alternated with square washers 12, the bars themselves being formed square or oblong in cross-section. The square form of these bases prevents the teeth from turning on the bars, and the construction is such as to prevent the teeth falling off and being lost, as is frequently the case with present forms of cutter-heads. In Fig. 12 the teeth are curved inward instead of outward, as in Figs. 6 to 11.

In the modification shown in Figs. 13 to 19 the bars are formed with undercut grooves 13, and the bases of the teeth have forks 14, which slide in said grooves and hold them in place. In the form shown in Figs. 18 and 19 the teeth are also formed with wearing-plates 15, which protect the bases of the teeth from wearing too fast.

In the modification shown in Figs. 20 to 25 the teeth are formed upon plates 16, which are secured by bolts 17 to the bars. This form is advantageous because it permits of the plates containing the teeth being readily removed and replaced when worn, while at the same time protecting the bars from wear. In the modification shown in Fig. 25 two such plates 17 are provided for each bar, thus permitting of the plates being removed separately if one end is worn faster than the other. It will be observed that the lower or thicker end 19 of the plate is beveled to rest against the ring 5 and receive the end thrust from the teeth.

I do not claim herein the bases 10 or the plates 16, formed integral with the teeth and protecting the bars from wear, as these features form the subject of a separate application, filed August 21, 1906, Serial No. 331,476; nor do I claim herein the square bases or sleeves 11 or the forks 14, formed integral with the teeth and protecting the sides of the bars from wear, as these features form the subject of a separate application, filed August 21, 1906, Serial No. 331,475.

I claim—

1. A cutter-head comprising a shaft, a hub thereon, arms or spokes radiating from said hub, bars extending from the ends of said arms or spokes in planes oblique to that through the shaft, a ring connecting the other ends of said bars, and teeth carried by said bars, substantially as described.

2. A cutter-head comprising a shaft, a hub thereon, arms or spokes radiating from said hub, bars extending from the ends of said arms or spokes in planes oblique to that through the shaft, a ring connecting the other ends of said bars, and teeth carried by said bars, said teeth being provided with means for protecting the bars from wear, substantially as described.

3. A cutter-head comprising a shaft, a hub thereon, arms or spokes radiating from said hub, bars extending from the ends of said arms or spokes in planes oblique to that through the shaft, a ring connecting the other ends of said bars, teeth carried by said bars, said teeth being provided with means for protecting the bars from wear, and means for removably securing said teeth upon said bars, substantially as described.

In witness whereof I have hereunto set my hand in the presence of two subscribing witnesses.

JOHN F. OLLRICH.

Witnesses:
 BESSIE GORFINKEL,
 ANNIE PETERSON.